(12) United States Patent
St. Felix (10) Patent No.: US 12,103,368 B2
(45) Date of Patent: Oct. 1, 2024

(54) VEHICLE FOLDABLE COVER WITH THEFT SENSOR SYSTEM

(71) Applicant: Harold St. Felix, West Palm Beach, FL (US)

(72) Inventor: Harold St. Felix, West Palm Beach, FL (US)

( * ) Notice: Subject to any disclaimer, the term of this patent is extended or adjusted under 35 U.S.C. 154(b) by 140 days.

(21) Appl. No.: 18/084,354

(22) Filed: Dec. 19, 2022

(65) Prior Publication Data

US 2023/0202279 A1     Jun. 29, 2023

Related U.S. Application Data

(60) Provisional application No. 63/294,630, filed on Dec. 29, 2021.

(51) Int. Cl.
*B60J 11/04*     (2006.01)

(52) U.S. Cl.
CPC ..................... *B60J 11/04* (2013.01)

(58) Field of Classification Search
CPC ....................................................... B60J 11/04
USPC ..................................................... 340/426.1
See application file for complete search history.

(56) References Cited

U.S. PATENT DOCUMENTS

| | | | |
|---|---|---|---|
| 2,688,513 A | | 9/1954 | Poirier |
| 4,519,644 A | * | 5/1985 | Song ................... B60J 11/00 296/136.04 |
| 4,858,985 A | * | 8/1989 | Wojcik ................. B60J 11/02 296/136.03 |
| 4,951,993 A | * | 8/1990 | Taboada ............... B60J 11/00 296/136.13 |
| 5,040,557 A | * | 8/1991 | Morgan ................ B60J 11/00 296/136.02 |
| 5,413,396 A | * | 5/1995 | Poznansky ........... B60J 11/00 296/136.13 |

(Continued)

FOREIGN PATENT DOCUMENTS

| | | |
|---|---|---|
| CA | 2024536 A1 | 3/1992 |
| JP | 2003314925 A | 11/2003 |

(Continued)

*Primary Examiner* — Zhen Y Wu
(74) *Attorney, Agent, or Firm* — Robert C. Kain; Scott D. Smiley (57) ABSTRACT

Foldable vehicle cover (armed/unarmed) covers vehicle's front, mid-section, and rear, longitudinally, laterally and vertically. Longitudinal staves in separate cover segments permit lateral collapse of cover with draw cords in lateral cover channels (one cord-end attached at closed channel end and the cord extending outboard from open channel end). The unarmed cover has four operating modes: covered, uncovered, laterally compressed and folded (front and rear segments folded atop mid-sectional segment). An alarmed cover includes either pouches on inboard side of vertical cover portions or module attachment systems on the inboard side. Proximity alarm module is pouch mounted or attached and is removably coupled to vehicle vertical element via an electromagnetic/mechanical attachment sub-system. A proximity sensor generates ALARM sensor not proximate vehicle element. A transmitter generates RF ALARM and a software App on user's causes ALARM annunciation.

12 Claims, 4 Drawing Sheets

(56) References Cited

U.S. PATENT DOCUMENTS

| | | | | |
|---|---|---|---|---|
| 5,476,127 A * | 12/1995 | Fournier | | B60J 11/00 |
| | | | | 296/136.01 |
| 5,902,003 A | 5/1999 | Hindson | | |
| 6,056,347 A * | 5/2000 | D'Adamo | | B60J 11/00 |
| | | | | 296/136.02 |
| 6,070,629 A | 6/2000 | Whiteside | | |
| 6,092,857 A | 6/2000 | Rivas | | |
| 6,276,381 B1 | 8/2001 | O'Brien | | |
| 6,779,827 B2 * | 8/2004 | Clark | | B60J 11/04 |
| | | | | 296/136.01 |
| 6,964,446 B2 | 11/2005 | Porter | | |
| 8,091,947 B1 * | 1/2012 | Miller | | B60J 11/04 |
| | | | | 296/136.1 |
| 8,146,984 B2 | 4/2012 | Devereaux | | |
| 8,479,787 B1 | 7/2013 | Sahadeo et al. | | |
| 10,471,816 B1 * | 11/2019 | Young | | B60J 7/08 |
| 10,967,719 B1 * | 4/2021 | Mellick | | B60J 11/04 |
| 11,788,298 B2 * | 10/2023 | Bliss | | E04F 10/0692 |
| | | | | 160/67 |
| 2002/0105418 A1 * | 8/2002 | Yurimoto | | G08G 1/161 |
| | | | | 340/436 |
| 2003/0156018 A1 * | 8/2003 | Krohn | | B62J 19/00 |
| | | | | 340/426.1 |
| 2004/0123892 A1 * | 7/2004 | Kim | | E04H 6/025 |
| | | | | 135/88.08 |
| 2005/0151391 A1 * | 7/2005 | Bryd | | B60J 11/00 |
| | | | | 296/136.1 |
| 2006/0232095 A1 * | 10/2006 | Sedighzadeh | | B60J 11/02 |
| | | | | 296/98 |
| 2007/0216193 A1 | 9/2007 | Webber | | |
| 2007/0284023 A1 * | 12/2007 | Sitarz | | B60J 11/00 |
| | | | | 150/166 |
| 2009/0066112 A1 * | 3/2009 | Sharapov | | B60J 11/00 |
| | | | | 296/136.1 |
| 2011/0025089 A1 * | 2/2011 | Parker | | B60J 11/04 |
| | | | | 296/136.07 |
| 2011/0095561 A1 * | 4/2011 | Li | | B60J 11/04 |
| | | | | 296/136.13 |
| 2011/0156436 A1 | 6/2011 | Eggeman-Steffen | | |
| 2014/0284960 A1 | 9/2014 | Chang | | |
| 2015/0321544 A1 | 11/2015 | Costello | | |
| 2016/0009167 A1 * | 1/2016 | Ein | | B60J 11/04 |
| | | | | 150/166 |
| 2018/0118010 A1 | 5/2018 | Korros | | |
| 2018/0141422 A1 * | 5/2018 | Sarmova | | B60J 11/04 |
| 2019/0031008 A1 * | 1/2019 | Cassidy | | B60J 11/04 |
| 2019/0202274 A1 * | 7/2019 | Bates | | B60J 11/04 |
| 2020/0269945 A1 * | 8/2020 | Johnson | | A62C 3/07 |
| 2021/0370753 A1 * | 12/2021 | Stephens | | B60J 11/02 |

FOREIGN PATENT DOCUMENTS

| | | | |
|---|---|---|---|
| JP | 6383513 B2 | 8/2018 | |
| WO | 2016172533 A1 | 10/2016 | |

* cited by examiner

VEHICLE FOLDABLE COVER WITH THEFT SENSOR SYSTEM

This application claims priority to U.S. Provisional Patent Application No. 63/294,630, filed Dec. 29, 2021, the contents of which is incorporated herein by reference thereto. The present invention relates to a foldable cover for a car, motorcycle, truck, pickup truck or other similar vehicle as well as a boat or trailer or other apparatus. One embodiment of the invention includes a theft alarm system.

BACKGROUND OF THE INVENTION

There is a need to protect a vehicle from the adverse effects of the environment on the vehicle and, more particularly, to preserve the vehicle for future use. Herein "vehicle" includes, without limitation, an automobile, motorcycle, snowmobile, jet ski, small trucks (such as pickup trucks), as well as a boat (a water-borne vehicle) and a trailer. Although the drawings disclose the foldable cover used in connection with an automobile, the invention can be configured to the aforementioned vehicles.

U.S. Pat. No. 6,276,381 discloses a protective covering device having a weather-resistant sheet of material wound about a spring-loaded roller. US Pub. Pat. Appln. No. 20070216193 discloses a protective flexible car cover which is designed to be attached and detached to a foldable deployment rod which facilitates deploying and removing the car cover without any motorized aids and which also provides for convenient storage of the car cover when it is not in use. The attachment of the car cover to the deployment rod is conveniently effected by a material like Velcro®. The car cover has magnets or weights around its periphery to help hold the cover in place while being deployed and after deployment. Additional panels on the underside of the car cover and at the rear of the car cover are provided which can be held in place by the side doors of the vehicle or by the trunk lid or rear door of the vehicle.

US Pub. Pat. Appln. No. 20140284960 discloses a washable vehicle cover system comprising: a washable vehicle cover assembly including a washable cover having; a top side; and a bottom side; a drawstring assembly having; at least one cord-sleeve with at least one opening slit; at least one cord; and at least one fastener; wherein the washable vehicle cover system comprises the washable vehicle cover assembly. The washable vehicle cover assembly comprises in combination the washable cover and the drawstring assembly.

U.S. Pat. No. 5,902,003 discloses a vehicle cover with a rewind strap. Japanese Pub. Pat. Appln. No. 6383513 discloses a front to rear pull cord. U.S. Pat. No. 6,092,857 discloses the use of anchors for the cover. US Pub. Pat. Appln. No. 20110156436 discloses a car cover configured specifically to be anchored to the vehicle tires, thus ensuring that the cover remains securely in place over the vehicle, regardless of wind activity. U.S. Pat. No. 8,146,984 discloses a car cover anchored with magnets or VELCO® attachments or suction cups.

US Pub. Pat. Appln. No. 20180118010 discloses a system for protecting a motor vehicle with an electronic lock openable by a remote radio signal originating from outside the motor vehicle. The fabric is configured to attenuate the transmission of radio waves therethrough. The fabric has a plurality of fibers plated with a metal and formed into a flexible washable, planar material, the fabric. The fabric is shaped to comprise a three-dimensional shape approximating the exterior shape of the motor vehicle and is disposed about the exterior of the motor vehicle substantially enclosing the top and sides of the motor vehicle. US Pub. Pat. Appln. No. 20190202274 discloses a vehicle cover assembly with repositionable magnets for magnetically securing a vehicle cover to a vehicle includes an inner liner that is positioned on a vehicle.

SUMMARY OF THE INVENTION

The problem solved by the present invention is to provide staves in a fabric-based vehicle cover whereby when the cover is removed, the cover is folded over and about staves and can be rolled into a compact shape. Another problem solved by the present invention is that vehicles which are covered are susceptible to theft or vandalism. The armed cover serves to (a) protect the vehicle from its environment and (b) provide a simple, easy to implement anti-theft alarm system wherein bad actors cannot easily locate the anti-theft system because it is hidden by the cover. It is a further object of the invention to provide a theft alarm system covered by removable vehicle cover which sends and alarm signal to the user via radiofrequency RF or wireless network (cell phone network; wifi network; near field communications; or far field communications network) when a vandal seeks to remove the cover and potentially steal the vehicle.

It is an object of the invention provide either an armed or an unarmed fabric cover for a vehicle.

It is another object of the present invention to provide an unarmed fabric cover which is configured to be easily removed from the vehicle, then laterally compressed and then longitudinally folded into a relatively compact shape.

It is an additional object of the invention to prove an armed vehicle cover wherein the anti-theft module is disposed at one of a multiplicity of locations beneath the inboard vertical sides of the cover.

It is a further object of the invention to provide an armed cover wherein the user places the anti-theft module at a desired location (in contrast to the factory-designated location).

It is another object of the present invention to provide an armed cover wherein the user can move the anti-theft module to other locations beneath the inboard vertical sides of the cover.

The foldable vehicle cover is designed to encompass or cover the vehicle's front vehicle segment, the mid-sectional vehicle segment and the rear vehicle segment. As is commonly known, each vehicle segment has longitudinal, lateral and vertical elements. In one embodiment, the cover includes a flexible fabric cover with front-end, mid-sectional, and rear-end segments. The front-end fabric segment spans the front vehicle segment and its longitudinal, lateral and vertical elements. The mid-sectional fabric segment also covers the mid-sectional vehicle segment's longitudinal, lateral and vertical aspects. Likewise, the rear-end fabric segment covers the longitudinal, lateral and vertical elements of the rear vehicle segment. The covers have a plurality of front longitudinal staves on its front-end fabric segment, another a plurality of mid-sectional longitudinal staves on its mid-sectional fabric segment, and a further plurality of rear-end longitudinal staves carried by its rear-end fabric segment. The fabric also has draw cord channels. A laterally disposed front-end draw cord channel is formed or sewn into the front-end fabric segment, and a laterally disposed rear-end draw cord channel is formed in the rear-end fabric segment. The front cord channel has a first closed channel end and a first open channel end. The rear cord channel has a second closed channel end and a second open channel end.

Draw cords are fixed at one end of the channel and extend outboard from the open channel ends. More particularly, a front-end draw cord is lodged in the front cord channel with a first outboard cord extension span extending outboard away from the first open channel end. This is apparent when the front-end fabric segment is substantially laid-out flat. The rear-end draw cord is disposed in the rear cord channel and has a second outboard extension extending outboard away from the second channel open end. The front-end and read-end draw cords are respectively proximally coupled to the first and second cord closed channel ends.

The stave carrying fabric cover has, in one embodiment, four (4) operating modes dependent upon the then needed user function. A first covering mode is noted when the front-end, mid-sectional, and rear-end fabric segments cover the longitudinal, lateral and vertical elements of the front, mid-sectional and rear vehicle segments. In a second uncovered mode, the front-end, mid-sectional, and rear-end fabric segments are withdrawn from the longitudinal, lateral and vertical elements of the front, mid-sectional and rear vehicle segments. In a laterally compressed mode, the front and rear draw cords respectively have substantial first and second cord-spans withdrawn from the front and rear cord channels such that the first and second closed channel ends are proximal or next to the first and second open channel ends. In a longitudinally folded mode, the front and rear sectional fabric segments are folded over atop each other and atop the mid-sectional fabric segment.

Further embodiments of the invention include a feature wherein the first closed channel end and the coupled front draw cord are proximal a longitudinally extending lower edge of the front-end fabric segment. In a similar manner, the second closed channel end and the coupled rear draw cord are proximal or near the longitudinally extending edge of the rear-end fabric segment. Another embodiment has longitudinal staves which are longitudinally spaced apart and are only disposed in the respective front-end, mid-sectional, and rear-end fabric segments. In this embodiment, each stave in each respective plurality of front, mid-sectional, and rear-end longitudinal staves is laterally spaced apart over the lateral span of the corresponding front-end, mid-sectional and rear-end vertical elements when the stave carrying fabric cover is in the first covering mode.

An additional embodiment has an intermediate cord channel in the mid-sectional fabric segment, a third closed channel end and a third open channel end and an intermediate draw cord disposed in the intermediate cord channel. In a similar manner to the front and rear draw cords, the intermediate cords has a third outboard extension extending outboard away from the third open channel end when the fabric cover is substantially laid-out flat. The intermediate draw cord proximally coupled to the third channel end.

When an anti-theft device or security module is used, the foldable vehicle cover includes one or more pouches carried on an inboard side of vertical cover portions of the front-end, mid-sectional, and rear-end fabric segments. The proximity sensitive alarm module (the anti-theft device or security module) is configured to annunciate an alarm when the proximity sensitive alarm module is armed ON and the proximity sensitive alarm module is no longer proximal the corresponding front, mid-sectional, or rear vehicle vertical element.

In a different embodiment, an alarmed foldable vehicle cover is employed. This cover, similar to the cover described earlier, encompasses the front vehicle segment, mid-sectional vehicle segment and rear vehicle segment. The armed cover has a flexible fabric cover with front-end, mid-sectional, and rear-end cover segments which cover the vehicle's longitudinal, lateral and vertical elements. A plurality of front longitudinal staves is carried by the front-end cover segment, mid-sectional cover segment, and rear-end cover segment. Front, mid-sectional and rear pull-cord closure systems are respectively employed in the front-end, mid-sectional, and rear-end cover segments. The front, mid-sectional and rear pull-cord closure systems gather and compress the front-end, mid-sectional, and rear-end cover segments over atop one another upon closure of the front, mid-sectional and rear pull-cord closure systems. The stave carrying fabric cover has, in this embodiment, (i) a first covering mode wherein front-end, mid-sectional, and rear-end fabric segments are adapted to cover longitudinal, lateral and vertical elements of the front, mid-sectional and rear vehicle segments, (ii) a laterally compressed mode when the respective front, mid-sectional and rear pull-cord closure systems gather and compress the front-end, mid-sectional, and rear-end cover segments over atop one another, and (iii) a longitudinally folded mode wherein the front-end and rear-end sectional fabric segments are folded over atop each other and atop the mid-sectional fabric segment.

The cover has either (a) one or more pouches carried on an inboard side of vertical cover portions of at least one of the front-end, mid-sectional, and rear-end fabric segments, or (b) one or more module attachment systems carried on the inboard side of vertical cover portions of at least one of the front-end, mid-sectional, and rear-end fabric segments. The armed cover has a proximity alarm module adapted to be removably coupled to at least one of the front, mid-sectional or rear vehicle vertical elements. The alarm module being disposed in the pouch or attached via the module attachment system.

An electromagnetic or mechanical attachment sub-system enables removable attachment of the proximity alarm module to the desired location on the vehicle's front, mid-sectional or rear vertical element. The proximity alarm module has a proximity sensor generating an ALARM EVENT signal when the proximity alarm module is no longer coupled to or near the adjacent vehicle vertical element. The proximity alarm module has a transmitter, coupled to the proximity sensor, which generates an RF ALARM EVENT signal in the presence of the ALARM EVENT signal from the alarm module. A software App on the user's phone receives a complementary RF ALARM EVENT signal and causing an ALARM annunciation.

Further refinements of the invention include locating the pouch or pouches along an inboard side edge defining a lower outer edge of vertical elements of the front-end, mid-section, and rear-end cover segments. In this embodiment, the proximity alarm module is a user-mounted-and-applied proximity alarm module because the user places the alarm module in one of the plurality of pouches. In another embodiment, module attachment systems are employed. The plurality of module attachment systems can be an attachment system from the group of attachment systems comprising a hook and loop attachment system, a tie-off attachment system, a snap-on, button-on, and clip-in attachment system. Similar to the pouch system, the attachment system can be disposed along an inboard side edge defining a lower outer edge of vertical elements of the front-end, mid-section, and rear-end cover segments. The armed cover may employ different modifications as described above.

Although the invention is illustrated and described herein as embodied in a vehicle cover, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

The term "fabric" may be any type of protective sheet, cloth, plastic of other composite material. Also, the fabric channel (within which runs the draw cords) can be made of fabric, may be a sewn element, or may be a series of loops or tunnel-like elements guiding and capturing the draw cords. The channels may be made of a different material than the fabric of the cover.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

In the description of the embodiments of the present invention, unless otherwise specified, azimuth or positional relationships indicated by terms such as "up", "down", "left", "right", "inside", "outside", "front", "back", "rear", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the term "approximately" applies to all numeric values, whether or not explicitly indicated. The term generally refers to a range of numbers that one of skill in the art would consider equivalent to the recited values (i.e., having the same function or result). As used herein, the term "about" or "proximal" refer to both adjacent and nearly adjacent components, whether or not explicitly indicated. These terms generally refer to a range of physically close components, including but not limited to directly mechanically affixed, which operate within the functional description shown in the drawings and explained herein as the same would be apparent to one of skill in the art as being equivalent (i.e., having the same function or result). In this document, the term "longitudinal" should be understood to mean in a direction corresponding to an elongated direction of the vehicle (from the vehicle's front to the vehicle's rear). The term "lateral" is normal or perpendicular to the referenced longitudinal extent.

The terms "program," "software application," "App" and the like as used herein, are defined as a sequence of instructions designed for execution on a computer system. A "program," "computer program," or "software application" or "App" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

BRIEF DESCRIPTION OF THE DRAWINGS

The invention and the various embodiments of the invention are discussed in the detailed description below, and additional objects and advantages of the present invention are found in the detailed description below, when taken in conjunction with the accompanying drawings.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. Similar numerals similar items drawings. It is to be understood that the disclosed embodiments are merely exemplary of the invention, which can be embodied in various forms.

Figure 1:
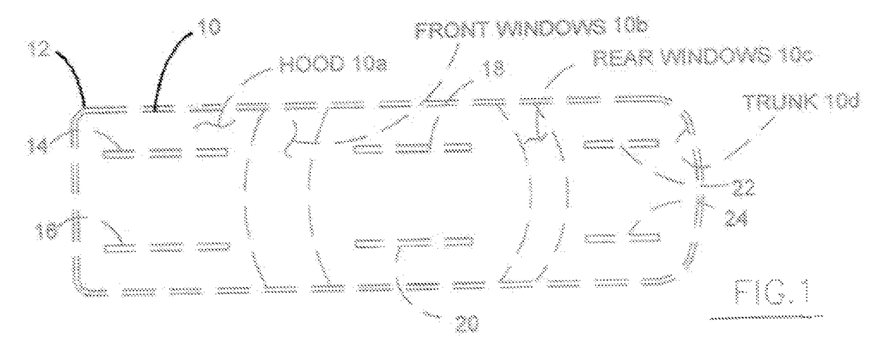
FIG. 1 diagrammatically illustrates the vehicle as an automobile covered by a removable cover.
Figure 8:
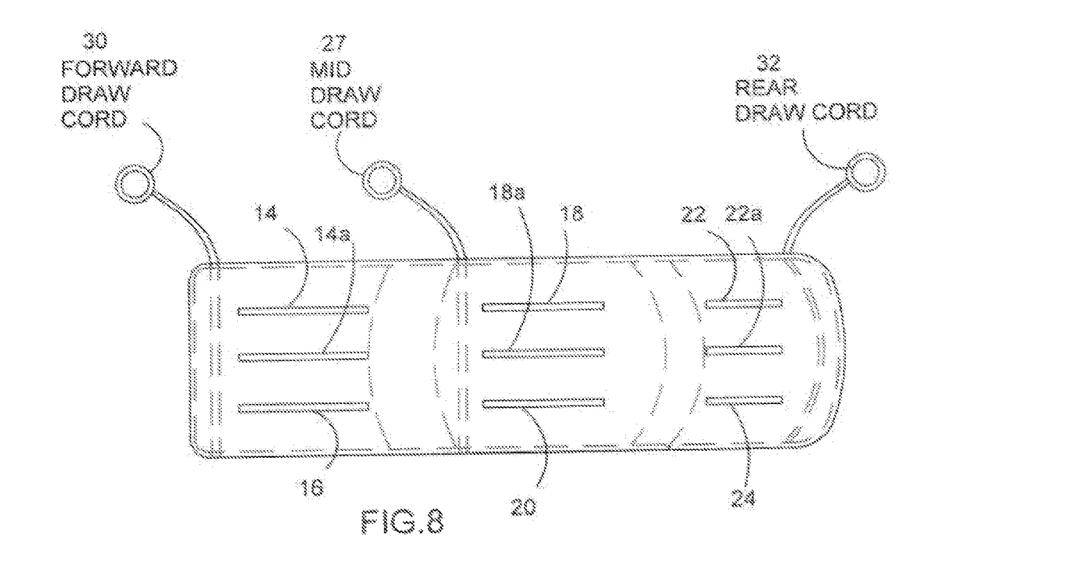
FIG. 8 diagrammatically illustrates that the cover may have a series of draw cords for closure purposes.

FIG. 1 shows cover 12 includes a number of forwardly disposed longitudinal staves 14, 16 over the hood of the vehicle, intermediate staves 18, 20 over the roof of the vehicle, and rearward staves 22, 24 over the rear or trunk of the vehicle. The staves are also laterally spaced apart. The flexible fabric cover has front-end (see hood 10a), mid-sectional (see mid-region between windows 10b, 10c), and rear-end segments (see trunk 10d) which span the front vehicle segment longitudinal and lateral elements (see FIG. 1) and vertical vehicle elements (see FIG. 2). FIG. 8 diagrammatically shows that the number of staves can be changed (increased or decreased) dependent upon the size of the car, boat, vehicle, trailer or other mobile item to be covered (see additional staves 14a, 18a, and 22a). These staves are generally rigid and are generally longitudinal elements either integrated into cover 12 or attached, preferably, to the underside of the cover. As noted in FIG. 1, automobile 10 (shown in dashed lines) has a hood 10a, a front window 10b, a rear window 10c, and a trunk 10d. In one embodiment, the longitudinal staves have a longitudinal length less than the longitudinal span of the respective vehicle element (see, for example. FIG. 1, stave 14, being shorter than the front vehicle element of hood 10a). Also, the plurality of staves do not span or longitudinally cover the transitional vehicle elements between the front vehicle element (hood 10a), the roof (between windows 10b, 10c) and the rear element (truck 10d). This enhances the ability of the user to gather up the cover with the draw cords (explained below) and also to fold up the cover (see FIG. 4C).

Figure 2:
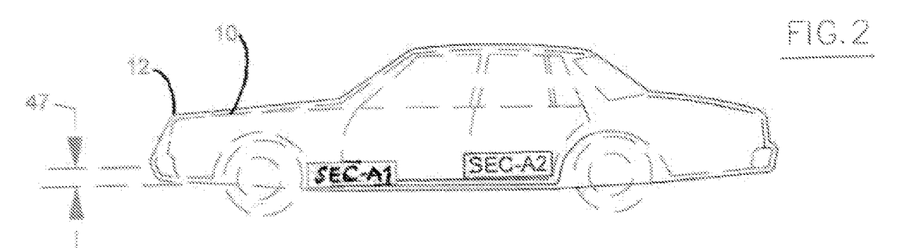
FIG. 2 diagrammatically illustrates a side view of the cover system with the cover encompassing the automobile.

FIG. 2 diagrammatically illustrates a side view of cover 12 encasing automobile 10. The optional anti-theft sensor system SEC-A1 and SEC-A2 is discussed later in connection with FIGS. 5, 6 and 7. In general, any disturbance or removal of the anti-theft sensor results in and alert sent to the user from the wireless communication module in the sensor system.

FIG. 2 shows proximity alarm modules SEC-A1, SEC-A2, adapted to be removably attached to at least one of the front, mid-sectional or rear vehicle vertical elements. The proximity alarm module is disposed along an inboard side edge (lower region 47) defining a lower outer edge of vertical elements of the front-end, mid-section, and rear-end fabric cover segments. In one embodiment, the proximity alarm module is a user-mounted-and-applied proximity alarm module placed in one of the plurality of pouches or user-applied module attachment systems. In one embodiment, the inboard side of the fabric has one or more pouches (see FIG. 5, pouch 41) or one or more module attachment systems in lower region 47 (FIG. 2). These pouches or module attachment systems are carried on the inboard side of vertical cover in one or the other or all of front-end, mid-sectional, and rear-end fabric segments. One or more alarm modules SEC-A1, A2 are disposed in one or more pouches or are attached to the fabric by one or more module attachment systems. The module attachment systems may be a hook and loop attachment system (VELCRO®), a tie-off attachment system (e.g., fabric ties that loop around the alarm module or loop through apertures on the alarm module), a snap-on system, a button-on system, or a clip-in attachment system.

Figure 3:
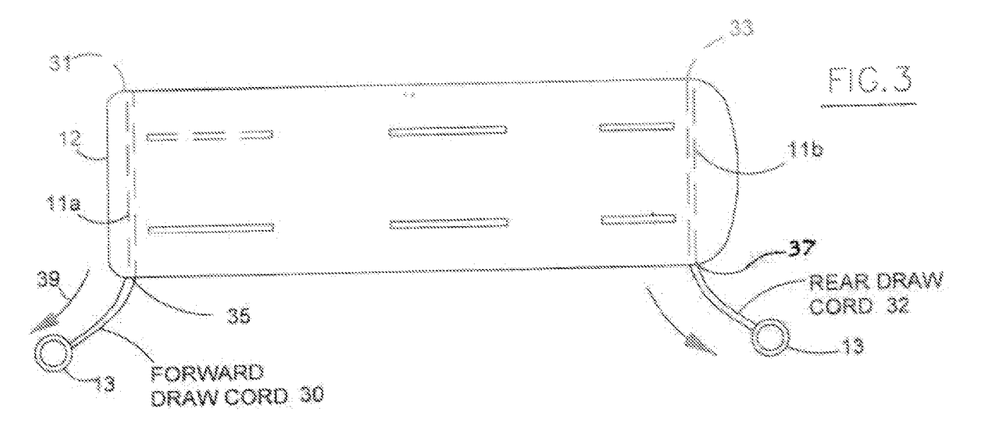
FIG. 3, diagrammatically illustrates that the cover has been removed from the automobile and the cover is generally laid on a flat surface, pavement or ground surface.

In FIG. 3, the cover 12 has been removed from automobile 10 and is generally laid on a flat surface, pavement or ground surface. Cover 12 as front and rear fabric channels 11a and 11b (shown in dashed lines) therein. Additionally, the cover may include a mid-sectional cord channel for the mid-section of the vehicle between windows 10b, 10c. A forward or front-end draw cord 30 and a rearward or rear draw cord 32 are threaded through the respective channel 11a, 11b. The inboard terminal ends 31, 33 of draw cords 30, 32 are attached at one end of the fabric channel generally opposite open channel ends 35, 37. Draw cords 30, 32 run through the channel 11a, 11b. In the illustrated embodiment, each draw cord has a handle 13 at its outboard, exposed terminal end. As used herein, the term "outboard" refers to items that are remote from the referenced item which is "inboard" the outboard item.

For example, draw cords 30, 32 extend laterally across vehicle and one end of the draw cord is proximally attached to a closed end of the fabric channel, which closed end is opposite the open channel end 35, 37 of the fabric channel 11a, 11b. Channels 11a, 11b have a closed channel end that is in the lower region 47 of the vertical vehicle element cover. Channels 11a, 11b also have an open channel end in the lower region 47 opposite the closed channel end. The respective draw cords are proximally affixed or attached to the corresponding closed channel end.

In this manner, when the front and rear draw cords are pulled out from the channels, these draw cords have substantial first (the front) and second (the rear) cord-spans which are withdrawn from the front and rear cord channels. Stated otherwise, the inboard cord ends need only be proximally attached to the closed channel ends to enable the user to gather the fabric cover closed such that the first and second closed channel ends are proximal to the first and second open channel ends. See FIG. 4B. If an intermediate draw cord disposed in an intermediate fabric channel is employed, this intermediate cord is similarly attached at one end, and when the cord is pulled out of the channel, a substantial intermediate cord-span is withdrawn from the intermediate open channel end. The open channel ends are always a short cord length away from the user pull rings 13.

Operationally, when the user pulls the draw cord outboard from fabric channel 11a, 11b, as shown by arrow 39, the car cover generally laterally collapses. The same is true regarding the operation of the rear draw cord 32. Preferably, the draw cords can be pulled outboard independent of each other.

Figure 4A:
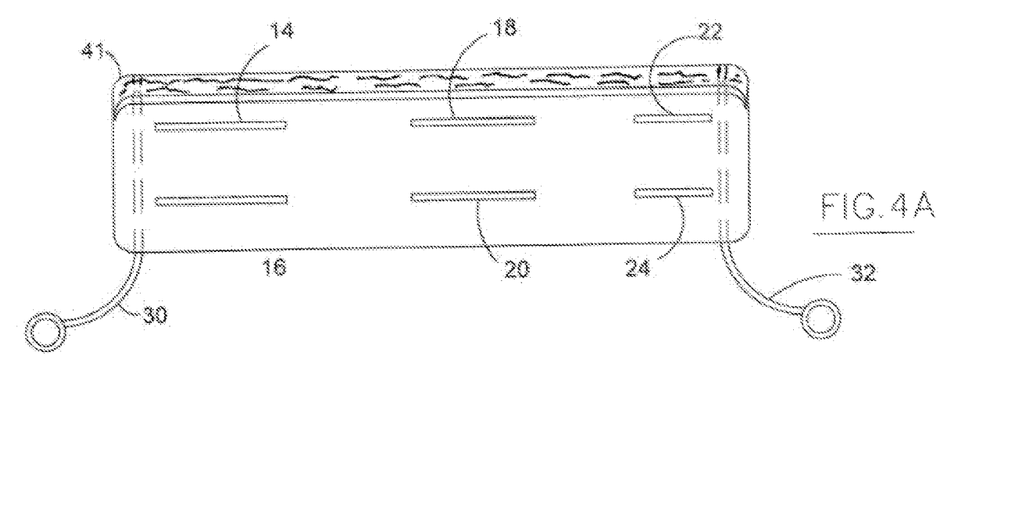
FIG. 4A diagrammatically shows that draw cords that have partly collapsed the cover in a defined lateral aspect.

FIG. 4A diagrammatically shows that draw cords 30, 32 have partly collapsed the cover at lateral region 41. In other words, the cover has been pulled or bunched proximal to wanted to know staves 14, 18, 22.

Figure 4B:
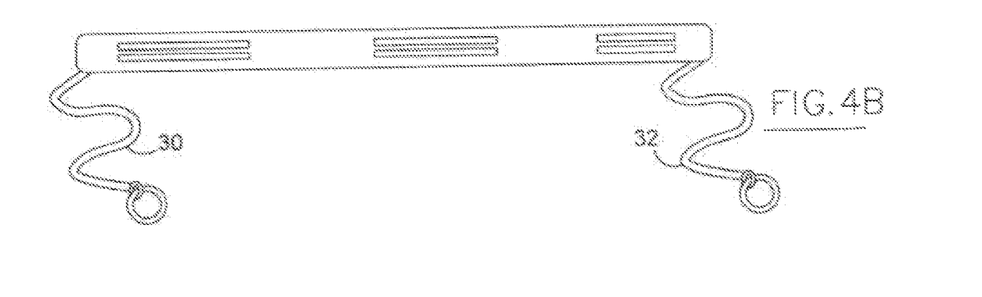
FIG. 4B shows draw cords which have substantially collapsed, in a lateral manner, the entirety of the cover.

In FIG. 4B, draw cords 30, 32 have substantially collapsed, in a lateral manner, the entirety of the cover. Stated otherwise, staves 14 and 16 are generally proximal each other (excepting the intermediate bunched up vehicle cover material), staves 18, 20 are proximal each other and staves 22, 24 are proximal each other.

Figure 4C:
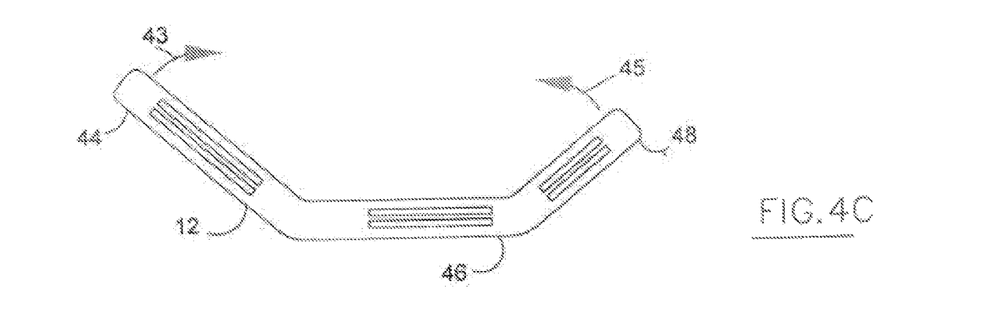
FIG. 4C diagrammatically shows that the cover is longitudinally folded unto itself.

In FIG. 4C, cover 12 is longitudinally folded unto itself as shown by the arrows 43, 45. The staves define, in a general sense, longitudinal cover segments such that front cover segment 44 can be folded over mid cover segment 46. Before or after folding over the forward cover segment 44, rear cover segment 48 can be folded either atop the midsectional cover segment 46 or over the top of forward cover section 44. The result is that the stave carrying fabric cover has, in one embodiment, four (4) modes.

A first covering mode wherein front-end, mid-sectional, and rear-end fabric segments cover the longitudinal, lateral and vertical elements of the front, mid-sectional and rear vehicle segments (see FIGS. 1 and 2). A second uncovered mode wherein front-end, mid-sectional, and rear-end fabric segments are withdrawn from the longitudinal, lateral and vertical elements of the front, mid-sectional and rear vehicle segments (see FIG. 3). A laterally compressed mode when the front-end and rear-end draw cords 30, 32 have substantial first and second cord-spans withdrawn from the front and rear cord channels (see cord-span in FIG. 4A, cord 30) such that the first and second closed channel ends are proximal to the first and second open channel ends (see FIG. 4B). A longitudinally folded mode wherein the front and rear sectional fabric segments 44, 48 are folded over atop each other (see FIG. 4C, folding actions 43, 45) and atop the mid-sectional fabric segment 46.

As an option, the foldable covers may include a user-applied security theft system sewn-in, adhered to, or otherwise mounted in the cover. In FIG. 2, the user-applied security theft system units SEC-A1 and SEC-A2 are located in two longitudinally spaced part locations. The user, at his or her option, selects the anti-theft sensor location. For example, the inboard side of the cover may have several locations or pockets which enable the user to slide in and position the anti-theft security sensor. The term "SEC" refers to a security, antitheft system. In one embodiment, the security sensor is permanently attached to the fabric cover at a hidden, inboard location. In other embodiments, the security sensor proximity alarm module is movable, replaceable, customizable, detachable, and attachable by the user. In this manner, the user can hide the security sensor proximity alarm module in various locations about the vehicle in lower region 47. The lower region 47 is an inboard side edge defining a lower outer edge of vertical vehicle elements of the front-end, mid-section, and rear-end cover segments.

Figure 5:
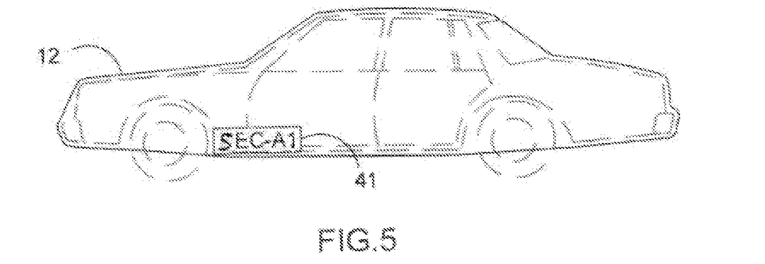
FIG. 5 diagrammatically shows one of the many locations for the user-applied security theft system. It should be noted that the anti-theft system could be located at any user-accessible location beneath the cover. In other words, the location of the anti-theft system is purely exemplary.

In FIG. 5, the user-applied security theft system SEC-A1 is shown attached to a lower region of the car cover 12 slightly rearward of the wheel well of the car. The pocket or pouch for the anti-theft system is shown by dashed lines 41. A VELCRO® attachment or other loop and hook cloth attachment system may be employed.

In general, the user-applied security system has several features. One feature is that the user attaches or mounts the security system at any convenient location beneath the car or apparatus cover 12. For example, the lower region 47 of the cover shown in FIG. 2 may have one or the other of hook or loop cloth attachment whereas anti-theft system casing includes a strip or patch or several patches of the complementary hook or loop cloth attachment system. The antitheft system is attached to both the cover in these removably mounted on the vehicle. To attach the security system beneath the cover 12, the user may be supplied with a Velcro-type attachment system that he or she can attach at a desired location on the underside of cover 20. The other interlocking or complementary segment of the Velcro attachment is fixedly attached to the antitheft security alarm, SEC-A1. As is known, Velcro consists of a two-part attachment system, one part being micro-hooks and the second complementary part being micro-loops. Other attachment mechanisms and systems may be utilized, such as a fabric tie off, pouches with button closure systems or snap closure systems or toggle closure systems.

One limiting factor as to the location of the anti-theft security system is that the system should be attached to a region where the vehicle, automobile, boat or apparatus defines an outer metallic surface. Many cars and automobiles have metal surfaces. A trailer vehicle typically includes longitudinal rails which are made of metal. The proximity alarm module works by sensing the proximal position of the vehicle metal and the alarm module.

Figure 7:
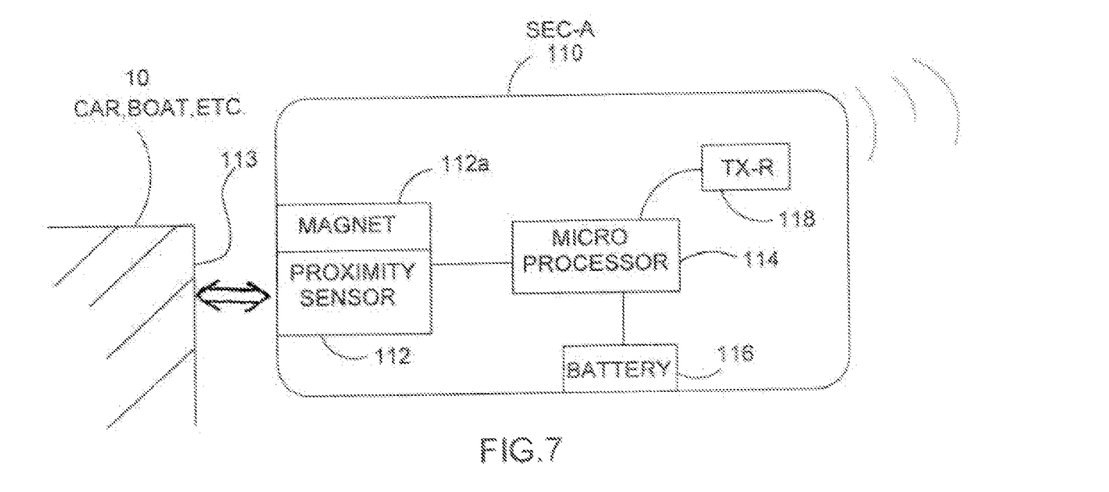
FIG. 7 is a block diagram diagrammatically showing key elements of the security alarm system, which includes a magnet or vehicle proximity sensor as part of the theft detection.

As shown in FIG. 7, which is a block diagram, the security alarm system 110 includes a magnet 112a and a proximity sensor 112. The metallic surface of the car, boat or apparatus is diagrammatically illustrated as surface 113. If a magnet utilized, magnet 112a maintains the anti-theft device close to the vehicle. The magnet 112a is therefore removably attached to vehicle surface 113 by electromagnetic force. The alarm system may have an electromagnetic or mechanical attachment means for removably attaching the proximity alarm module to the at least one of the front, mid-sectional or rear vehicle vertical elements. The function of this alarm attachment system is to keep the alarm system 110 close to the vehicle surface. The proximity sensor 112 in the alarm system 110 can be a metal proximity sensor or and inductive proximity sensor. The sensors may be magnetic, resistive, inductive or capacitive sensors. The proximity sensor 112 is activated to an ALARM state when the sensor moves away from the vehicle. When the magnet 112a is attached to the vehicle, the sensor is in a NO-ALARM mode or condition.

The other principal components of security anti-theft alarm system 110 are a microprocessor 114, a battery 116, and a transmitter-receiver 118. Persons of ordinary skill in the art would know that the various signals from certain components may require signal or data conversion to interact with the other components, however the key electrical components, modules and sub-systems are discussed herein. Operationally, the proximity alarm module 110 has a proximity sensor 112 generating an ALARM EVENT signal when the proximity alarm module 110 is no longer attached or proximal the front, mid-sectional or rear vehicle vertical elements. Therefore, the proximity alarm module has a transmitter 118, coupled to proximity sensor 112 and the microprocessor, which in combination generates an RF ALARM EVENT signal in the presence of the ALARM EVENT signal from the sensor 112. When sensor 112 is proximal or attached the vehicle, and assuming the module 110 is armed (an active ON condition), the sensor 112 maintains its NO ALARM condition. The microprocessor 114 processes the ALARM EVENT from proximity sensor 112 and then generates a complementary RF ALARM EVENT signal to the transmitter. Ultimately as explained below, this RF ALARM EVENT signal passes through one or more communications networks and ultimately, the complementary RF ALARM EVENT is further processed by to interact with a software App on the user's cell phone which cell phone receives a further complementary RF ALARM EVENT signal and causes or emits an ALARM annunciation on the user's phone.

Figure 6:
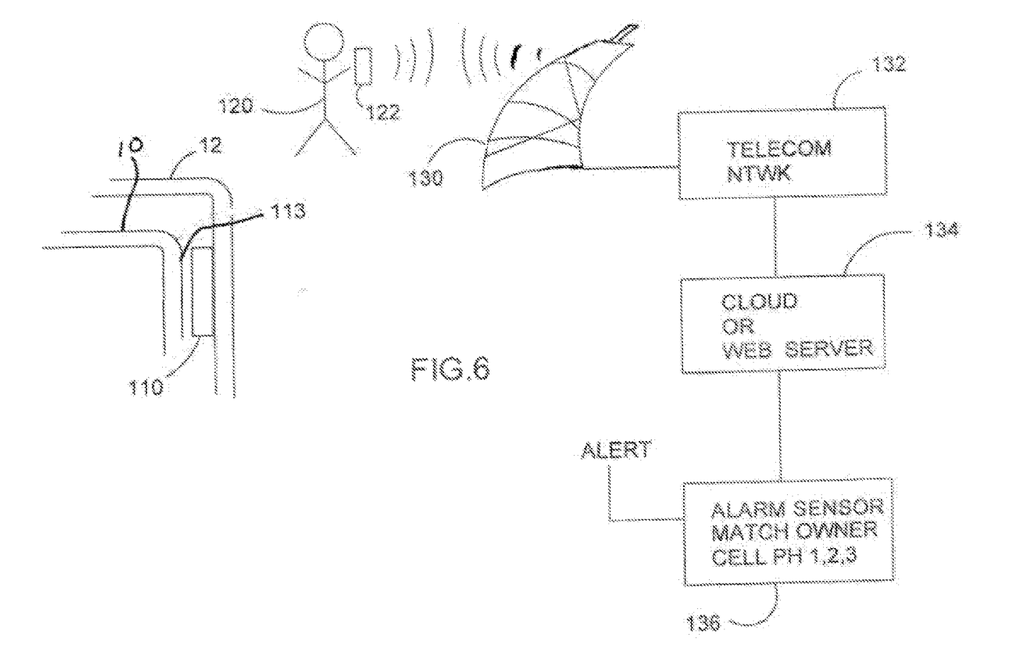
FIG. 6 diagrammatically shows the anti-theft security alarm and the communications system for alerting the user of a threat to his or her vehicle.

As shown in FIG. 6, the security system includes the vehicle mounted security alarm 110 module, which is diagrammatically shown as being in close proximity or attached/coupled to car, boat, vehicle or apparatus surface 113. The security system is disposed on the underside or the inboard side of cover 12 at an optional user-applied location selected by the user. If the anti-theft device is in a user-applied location beneath the vehicle cover, it would be difficult for thieves and other bad actors to quickly locate anti-test device. When configured as a user-applied system, the bad actors or thieves have a difficult time locating the security module beneath the vehicle cover, thereby enhancing security. If the security module 110 is built into the fabric cover or if the user has only 2-3 locations to insert module 110 beneath the cover, there is a risk that the bad actors would check those limited physical locations for the security module.

There are benefits to having a user-applied security system. The principal benefit is that the person seeking to steal the vehicle, car, boat, jet ski or apparatus would almost always need to remove the cover prior to the act of theft. By removing cover 12, the proximity sensor 112 of the anti-theft device 110 is activated by triggering an ALARM condition due to movement of the proximity sensor 112. This ALARM activation triggers an alarm signal from transmitter-receiver 118 under the control of microprocessor 114. Security module 110 could have a motion sensor rather than a proximity sensor (sensing the proximity of the module 110 to the vehicle sideway). With a motion sensor, the result is the same because the bad actor needs to remove the cover prior to the theft or destruction.

The ALARM signal from module 110 can be transmitted through various, diverse wireless communications systems. For example, it is possible that receiver-transmitter 118 is a near field communications device (BlueTooth) which it is in communication range with user 120's cell phone 122. In that situation, the user would be notified when the thief removes cover 12 and activates proximity/motion sensor 112. The user's cell phone would sound an alarm (visual, audio or both, at the selection of the user, an ALARM annunciation) and the user would then call the police or otherwise confront the thief before the thief takes away the vehicle, car, jet ski, boat or other protected apparatus.

Alternatively, transmitter-receiver 118 could be coupled to the cell phone network or a far field wireless network and that ALARM signal would be detected by the cell phone network antenna 130 or the wireless communication receiver (the wireless communication receiver may be a WiFi communications channel between the module 110 and the user's cell phone, via a WiFi router). The ALARM signal would travel through the telecommunications network 132 (or WiFi) and be directed to a cloud-based server system or a web server indicated by functional block 134. Whether cloud-based or a web server, that system would include some type of memory or database matching the transmitter-receiver 118 device code, the specific device alarm code (the ALARM EVENT discussed above), and the user's cell phone number. Once the match to the user's cell phone is made, the system completes the ALARAM call to the user's phone. This functional aspect is noted in function block 136. Also, the user-and-device-and alarm code matching database may list, via a priority call list, that the security system would first call cell phone 1, then cell phone 2, and finally, if no communications channel was activated at the receiving end by cell phone 1, 2, then the system would call cell phone 3. In any event, cell phone 122 of user 120 would be activated. The user would then have the ability to call the police or otherwise deter the theft. The user has an App on his or her cell phone to accomplish these functions. In a WiFi-based or BlueTooth system, the cell phone would be paired to module 110.

In order to maintain the proximity sensor next to or adjacent to the vehicle, jet ski or trailer, the cover may include under-vehicle straps, an elastic lower band about its periphery (region 47), a series of magnets or other securing systems to assure that, if the wind blows the cover, the proximity sensor remains adjacent the vehicle, jet ski or trailer and that blast of wind does not activate the alarm.

FIG. 8 diagrammatically illustrates that the vehicle cover may have 3 draw cords 30, 27 and 32. Also, the cover in FIG. 8 has 3 laterally disposed longitudinal staves, 14, 14a, 16, 18, 18a, 20, 22, 22a, 24. The number of staves in the cover is a matter of manufacturer design.

The claims appended hereto are meant to cover all modifications and changes within the scope and spirit of the present invention.

What is claimed is:

1. A foldable vehicle cover for encompassing the front vehicle segment, mid-sectional vehicle segment and rear vehicle segment, each vehicle segment having longitudinal, lateral and vertical elements, the cover comprising:

a flexible fabric cover having front-end, mid-sectional, and rear-end segments, the front-end fabric segment adapted to span the front vehicle segment longitudinal, lateral and vertical elements, the mid-sectional fabric segment adapted to span the mid-sectional vehicle segment longitudinal, lateral and vertical elements, and the rear-end fabric segment adapted to span the rear vehicle segment longitudinal, lateral and vertical elements;

a stave carrying fabric cover including a plurality of front longitudinal staves carried by the front-end fabric segment, a plurality of mid-sectional longitudinal staves carried by the mid-sectional fabric segment, and a plurality of rear-end longitudinal staves carried by the rear-end fabric segment;

a laterally disposed front-end draw cord channel in the front-end fabric segment, and a laterally disposed rear-end draw cord channel in the rear-end fabric segment, the front-end draw cord channel having a first closed channel end and a first open channel end and the rear-end draw cord channel having a second closed channel end and a second open channel end;

a front-end draw cord disposed in the front cord channel with a first outboard extension extending outboard away from the first open channel end when the front-end fabric segment is substantially laid-out flat, and a rear-end draw cord disposed in the rear cord channel having a second outboard extension extending outboard away from the second channel open end when the rear-end fabric segment is substantially laid-out flat, the front and rear cord channels respectfully having first and second cord closed channel ends;

the front-end and read-end draw cords respectively proximally coupled to the first and second cord closed channel ends;

the stave carrying fabric cover having (i) a first covering mode wherein front-end, mid-sectional, and rear-end fabric segments are adapted to cover the longitudinal, lateral and vertical elements of the front, mid-sectional and rear vehicle segments, (ii) a second uncovered mode wherein front-end, mid-sectional, and rear-end fabric segments are withdrawn from the longitudinal, lateral and vertical elements of the front, mid-sectional and rear vehicle segments, (iii) a laterally compressed mode when the front-end and rear-end draw cords respectively have substantial first and second cord-spans withdrawn from the front and rear cord channels such that the first and second closed channel ends are proximal to the first and second open channel ends; and (iv) a longitudinally folded mode wherein the front-end and rear-end sectional fabric segments are folded over atop each other and atop the mid-sectional fabric segment.

2. The foldable vehicle cover as claimed in claim 1 wherein the first closed channel end and the coupled front draw cord are proximal a longitudinally extending edge of the front-end fabric segment and wherein the second closed channel end and the coupled rear draw cord are proximal the longitudinally extending edge of the rear-end fabric segment.

3. The foldable vehicle cover as claimed in claim 1 wherein the front, mid-sectional and rear longitudinal staves are longitudinally spaced apart and are only disposed in the respective front-end, mid-sectional, and rear-end fabric segments, and wherein each stave in each respective plurality of front, mid-sectional, and rear-end longitudinal staves is laterally spaced apart over the lateral span of the corresponding front-end, mid-sectional and rear-end vertical elements when the stave carrying fabric cover is in the first covering mode.

4. The foldable vehicle cover as claimed in claim 1 including an intermediate cord channel in the mid-sectional fabric segment with a third closed channel end and a third open channel end opposite the third closed end, and including an intermediate draw cord disposed in the intermediate cord channel with a third outboard extension extending outboard away from the third open channel end when the fabric cover is substantially laid-out flat, the intermediate draw cord proximally coupled to the third channel end.

5. The foldable vehicle cover as claimed in claim 2 wherein the front, mid-sectional and rear longitudinal staves are longitudinally spaced apart and is only disposed in the respective front-end, mid-sectional, and rear-end fabric segments, and wherein each stave in each respective plurality of front, mid-sectional, and rear-end longitudinal staves are laterally spaced apart over the lateral span of the corresponding front-end, mid-sectional and rear-end vertical elements when the stave carrying fabric cover is in the first covering mode.

6. The foldable vehicle cover as claimed in claim 5 including an intermediate cord channel in the mid-sectional fabric segment with a third closed channel end and a third open channel end opposite the third closed end, and including an intermediate draw cord disposed in the intermediate cord channel with a third outboard extension extending outboard away from the third open channel end when the fabric cover is substantially laid-out flat, the intermediate draw cord proximally coupled to the third channel end.

7. The foldable vehicle cover as claimed in claim 6 including one or more pouches carried on an inboard side of vertical cover portions of the front-end, mid-sectional, and rear-end fabric segments, and a proximity sensitive alarm module configured to annunciate an alarm when the proximity sensitive alarm module is armed ON and the proximity sensitive alarm module is no longer proximal the corresponding front, mid-sectional, or rear vehicle vertical element.

8. An alarmed foldable vehicle cover for encompassing the front vehicle segment, mid-sectional vehicle segment and rear vehicle segment, each vehicle segment having longitudinal, lateral and vertical elements, the alarmed cover comprising:

a flexible fabric cover having front-end, mid-sectional, and rear-end cover segments, the front-end cover segment adapted to span the front vehicle segment longitudinal, lateral and vertical elements, the mid-sectional cover segment adapted to span the mid-sectional vehicle segment longitudinal, lateral and vertical elements, and the rear-end cover segment adapted to span the rear vehicle segment longitudinal, lateral and vertical elements;

a stave carrying fabric cover including a plurality of front longitudinal staves carried by the front-end cover segment, a plurality of mid-sectional longitudinal staves carried by the mid-sectional cover segment, and a plurality of rear-end longitudinal staves carried by the rear-end cover segment;

front, mid-sectional and rear pull-cord closure systems respectively in the front-end, mid-sectional, and rear-end cover segments, the respective front, mid-sectional and rear pull-cord closure systems gathering and compressing the front-end, mid-sectional, and rear-end cover segments over atop one another upon closure of the front, mid-sectional and rear pull-cord closure systems;

the stave carrying fabric cover having (i) a first covering mode wherein front-end, mid-sectional, and rear-end fabric segments are adapted to cover longitudinal, lateral and vertical elements of the front, mid-sectional and rear vehicle segments, (ii) a laterally compressed mode when the respective front, mid-sectional and rear pull-cord closure systems gathering and compressing the front-end, mid-sectional, and rear-end cover segments over atop one another and (iii) a longitudinally folded mode wherein the front-end cover segment and rear-end cover segments are folded over atop each other and atop the mid-sectional cover segment;

at least one or more pouches carried on an inboard side of vertical cover portions of at least one of the front-end, mid-sectional, and rear-end fabric segments, or one or more module attachment systems carried on the inboard side of vertical cover portions of at least one of the front-end, mid-sectional, and rear-end fabric segments;

a proximity alarm module adapted to be removably coupled to at least one of the front, mid-sectional or rear vehicle vertical elements, the alarm module disposed in the at least one or more pouches or the at least one or more module attachment systems;

electromagnetic or mechanical attachment means for removably attaching the proximity alarm module to the at least one of the front, mid-sectional or rear vehicle vertical elements;

the proximity alarm module having a proximity sensor generating an ALARM EVENT signal when the proximity alarm module is no longer coupled to the at least one of the front, mid-sectional or rear vehicle vertical elements;

the proximity alarm module having a transmitter, coupled to the proximity sensor, generating an RF ALARM EVENT signal in the presence of the ALARM EVENT signal; and a software App receiving a complementary RF ALARM EVENT signal and causing an ALARM annunciation.

9. The alarmed foldable vehicle cover as claimed in claim 8 wherein the at least one or more pouches is a plurality of pouches disposed along an inboard side edge defining a lower outer edge of vertical elements of the front-end, mid-section, and rear-end cover segments, wherein the proximity alarm module is a user-mounted-and-applied proximity alarm module placed in one of the plurality of pouches.

10. The alarmed foldable vehicle cover as claimed in claim 8 wherein the one or more module attachment systems are a plurality of module attachment systems, the plurality of module attachment systems being an attachment system from the group of attachment systems comprising a hook and loop attachment system, a tie-off attachment system, a snap-on, button-on, and clip-in attachment system.

11. The alarmed foldable vehicle cover as claimed in claim 10 wherein the one or more attachment systems are disposed along an inboard side edge defining a lower outer edge of vertical elements of the front-end, mid-section, and rear-end cover segments and the attachment system mounts the proximity alarm module at user-selected location inboard on the vertical cover portions of the front-end, mid-sectional, and rear-end fabric segments.

12. The alarmed foldable vehicle cover as claimed in claim 8 wherein the front, mid-sectional and rear pull-cord closure systems include:

a laterally disposed front-end draw cord channel in the front-end fabric segment, a laterally disposed intermediate draw cord channel in the mid-sectional fabric segment, and a laterally disposed rear-end draw cord channel in the rear-end fabric segment, the front cord channel having a first closed channel end and a first open channel end, the rear cord channel having a second closed channel end and a second open channel end, and the intermediate cord channel having a third closed channel end and a third open channel end;

a front-end draw cord disposed in the front cord channel with a first outboard extension extending outboard away from the first open channel end when the front-end fabric segment is substantially laid-out flat, and a rear-end draw cord disposed in the rear cord channel having a second outboard extension extending outboard away from the second open channel end when the rear-end fabric segment is substantially laid-out flat, and an intermediate draw cord disposed in the intermediate cord channel having a third outboard extension extending outboard away from the third open channel end when the mid-sectional fabric segment is substantially laid-out flat;

the front end, intermediate and read-end draw cords respectively proximally coupled to the first, third, and second closed channel ends;

the stave carrying fabric cover having the laterally compressed mode when the front-end, intermediate and rear-end draw cords respectively have substantial first, third and second cord-spans withdrawn from the front-end, intermediate, and rear-end cord channels such that the first, third, and second closed channel ends are proximal to the first, third and second open channel ends.

* * * * *